Oct. 24, 1933.  A. H. SHOEMAKER  1,932,191
PNEUMATIC TIRE AND RIM
Filed Jan. 27, 1931
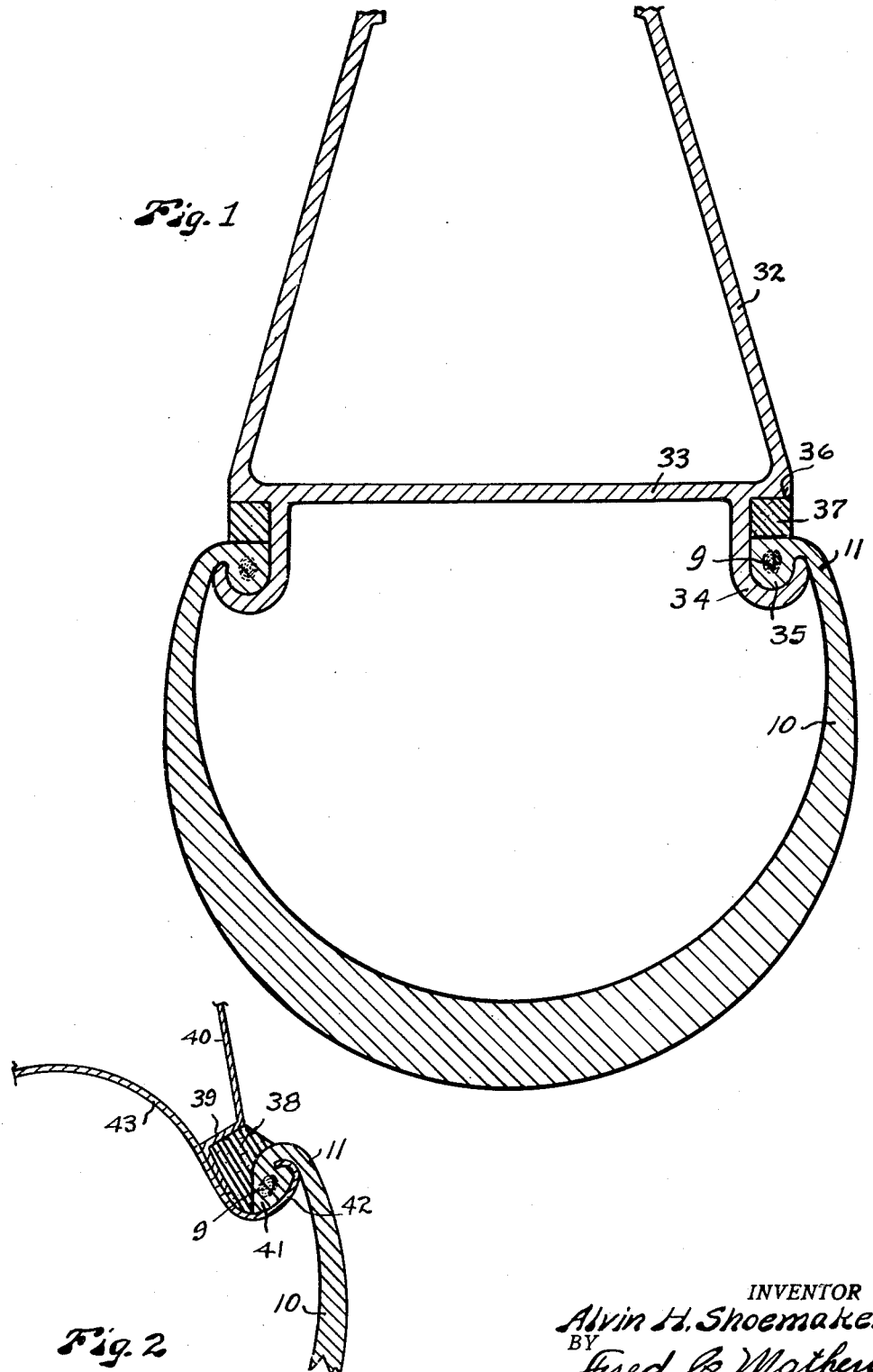
INVENTOR
*Alvin H. Shoemaker*
BY
*Fred B. Matheny*
ATTORNEY Patented Oct. 24, 1933

1,932,191

UNITED STATES PATENT OFFICE 1,932,191

PNEUMATIC TIRE AND RIM

Alvin H. Shoemaker, Seattle, Wash.

Application January 27, 1931. Serial No. 511,464

1 Claim. (Cl. 152—20)

My invention relates to improvements in pneumatic tires and rims and the general object of my invention is to provide a pneumatic tire in which the usual non-elastic bead rings are entirely dispensed with thereby cheapening the cost of manufacture of the tire, and to provide a simple and efficient rim structure for receiving and clamping and securely holding the bead portions of said tire and yet leaving the tire readily removable.

Another object of my invention is to provide a tire which may be reduced in diameter after it has been cured and before it is put into use thereby placing the rubber within said tire under compression.

A further object of my invention is to provide a tire which is adapted to make an air seal contact with a rim, whereby said tire may be used without an inner tube. In a tire of this nature it is desirable to dispense with non-elastic bead rings because such bead rings are susceptible to bending and, if they do become bent, are liable not to conform accurately to the shape of the rim thus interfering with the forming of the air seal between the tire and the rim.

In the manufacture of pneumatic tires, if the usual non-elastic or substantially non-elastic bead rings are left out of the bead portions of the tire at the time the tire is molded the process of manufacture is greatly simplified and the cost of production of the tires is very much reduced and the tires are left with relatively flexible bead portions instead of with stiff non-flexible bead portions thus making the tires easier and less cumbersome to handle in marketing.

In my present application I provide a tire which is made without the usual non-elastic bead rings and in which the bead portions of the tire are arranged to be securely clamped to the rim in such a manner as to form an air seal and in which the clamping means serves also to hold the tire to a reduced diameter whereby the rubber of which said tire is formed may be maintained under compression when in service thereby giving greater wearing qualities and rendering the tire more resistant to puncture and more self sealing in the event it is punctured.

A more specific object of my invention is to provide a rim having annular grooves or channels in its inner side adjacent its edges for the reception of the bead portions of a tire and to provide a tire having enlarged flexible bead portions disposed within said grooves and retained therein by means forming shoulders opposite the open sides of said grooves whereby the edges of the tire are drawn around the outer edges of the rim.

Other and more specific objects of my invention will be apparent from the following description taken in connection with the accompanying drawing and appended claim.

Fig. 1 is a sectional view on a radial plane of a tire and rim constructed in accordance with my invention.

Fig. 2 is a fragmentary sectional view of a modified form of my invention.

Referring to Fig. 1, I show a wheel 32 provided with a peripheral rim member 33 having at each edge thereof an annular groove formed by a curved portion 34 which is curved laterally outward and radially inward, and which, when seen in cross section, presents substantially the appearance of a hook which is turned with its open side toward the axis of the wheel, and which must be entered from the outside, whereby the bead portion 35 of a tire 10 may be placed within the grooved portion of the rim with the edge 11 of said tire extending over the outside of the curved edge portion of the rim. A shoulder 36 is formed at the edge of the rim 33 inwardly from, and substantially opposite to the open side of the adjacent rim groove and a retaining member 37 of non-metallic, somewhat flexible material is interposed between the shoulder 36 and the tire bead 35 to prevent displacement of the tire bead. The locking member 37 may be an endless ring, or a split ring, or it may be made in sections, and said ring is made of flexible, non-metallic material of firm cross section whereby it will securely hold the tire bead 35 when it is inserted as shown in Fig. 1.

In Fig. 2 I show another form of my invention in which a non-metallic locking member 38 is arranged to rest against an inclined shoulder 39 on a wheel 40 for securing a tire bead 41 within a grooved edge portion 42 of a wheel rim 43. The member 38 may be an endless ring or a split ring or it may be sectional.

In both forms of the invention above described, the locking members 37 and 38 respectively rest against positive shoulders 36 and 39, which shoulders are rigid with the wheel or rim, and said locking rings afford positive stop means positioned opposite the open sides of the bead receiving grooves for locking the beads in the grooves.

Flexible reinforcing members 9, as of canvas or cords may be embedded in the beads 35 and 41 to give a more substantial body to the beads and to prevent said beads being withdrawn from the grooves.

In these tires the base or bead portions of the tire are very widely spread apart, thus giving stability to the tire and tending to eliminate side sway and shimmy. This makes it practical to construct a tire of this nature which is free from longitudinal reinforcing and is reinforced only by radial cords which extend directly across the tire from one bead portion to the other.

When a tire made in accordance with this invention is placed on a rim and inflated the internal air pressure will draw the edge portions 11 of said tire very tightly around the outside of the grooved edges of the rim and will tend to draw the tire bead portions 35 or 41 very tightly between the inturned rim edges 34 or 42 and the locking members 37 or 38 thus forming an efficient seal against the escape of air and making it possible to use this tire without an inner tube. This seal at the location of the beads also effectively excludes dirt and moisture of all forms.

The foregoing description and accompanying drawing clearly disclose a preferred embodiment of my invention but it will be understood that this disclosure is merely illustrative and that such changes in the invention may be made as are within the scope and spirit of the following claim.

I claim:

In a tire and rim of the class described, a peripherally recessed rim affording a rim cavity for air, said rim having edges which are laterally curved outwardly and radially curved inwardly to afford grooves which open toward the axis of said rim; means on said rim forming shoulders of substantially the same width as said grooves positioned opposite said grooves in spaced relation from the open portions of said grooves; a tire having a transverse curvature of approximately one hundred eighty degrees and having bead portions of pliable and elastic material extending inwardly past the outer sides of said rim edges, said tire bead portions terminating in enlarged portions lying within said grooves; reinfrocing means embedded in said tire, said reinforcing means consisting of radially arranged cords which extend substantially crosswise of the tire from one bead portion to the other thereby forming a transverse binder and leaving the tire free to expand and contract longitudinally; and a flexible non-metallic substantially non-compressible retaining strip removably disposed between the enlarged portions of said tire bead and said shoulder, where said tire bead portions are secured within said rim grooves.

ALVIN H. SHOEMAKER.